United States Patent [19]

Bar-Lev

[11] 3,921,136

[45] Nov. 18, 1975

[54] AUTOMATIC PATTERN RECOGNITION METHOD AND APPARATUS PARTICULARLY FOR OPTICALLY RECOGNIZING CHARACTERS

[76] Inventor: Hillel Bar-Lev, 35 Haim Vital St., Jerusalem, Israel

[22] Filed: Jan. 12, 1973

[21] Appl. No.: 323,332

[30] Foreign Application Priority Data

Jan. 21, 1972 Israel ........................................ 38603

[52] U.S. Cl. ........... 340/146.3 H; 340/146.3 AH; 340/146.3 MA

[51] Int. Cl. ............................................ G06k 9/12

[58] Field of Search ............ 340/146.3 D, 146.3 F, 340/146.3 H, 146.3 Z, 146.3 MA, 146.3 J, 340/146.3 AC

[56] References Cited

UNITED STATES PATENTS

| | | | |
|---|---|---|---|
| 3,104,369 | 9/1963 | Rabinow et al. | 340/146.3 MA |
| 3,142,761 | 7/1964 | Rabinow | 340/146.3 H |
| 3,179,922 | 4/1965 | Rabinow | 340/146.3 H |
| 3,271,740 | 9/1966 | Rabinow | 340/146.3 H |
| 3,410,991 | 11/1968 | Van Berkel | 340/146.3 Z |
| 3,496,542 | 2/1970 | Rabinow | 340/146.3 MA |
| 3,501,623 | 3/1970 | Robinson | 340/146.3 D |
| 3,531,770 | 9/1970 | Mauch et al. | 340/146.3 F |
| 3,613,080 | 10/1971 | Angeloni et al. | 340/146.3 MA |
| 3,714,632 | 1/1973 | Cribbs et al. | 340/146.3 WD |
| 3,772,648 | 11/1973 | Schlang | 340/146.3 J |
| 3,827,025 | 7/1974 | Mauch et al. | 340/146.3 H |

OTHER PUBLICATIONS

Van Steenis, "Error Correcting Bar Coded Font," IBM Tech. Disclosure Bulletin, Vol. 7, No. 1, June, 1964, p. 48.

*Primary Examiner*—Gareth D. Shaw
*Assistant Examiner*—Leo H. Boudreau
*Attorney, Agent, or Firm*—Benjamin J. Barish

[57] ABSTRACT

Apparatus for recognizing multi-font alphanumeric characters comprises a single line of detectors for scanning the characters along a plurality of continuous scan lines each extending in the direction of the height of the characters, and means for sampling all the detectors each time a predetermined detector, located substantially midway of the lower-case characters excluding their ascenders and descenders, senses a change in sign in its sensed portion of the character. High and low limit sensing detectors of the linear array sense the average tops and bottoms of the projected lower-case characters, excluding their ascenders and descenders, and control alignment means to align the tops and bottoms between the latter detectors, and size-control means to vary the size of the optically projected characters so that the tops and bottoms coincide with the high and low limit sensing detectors.

19 Claims, 8 Drawing Figures

AUTOMATIC PATTERN RECOGNITION METHOD AND APPARATUS PARTICULARLY FOR OPTICALLY RECOGNIZING CHARACTERS

BACKGROUND OF THE INVENTION

The present invention relates to a method and apparatus for the automatic recognition of patterns. The invention is particularly useful for optical character recognition systems, and it is therefore described herein with respect to that application.

A number of techniques have been devised for the optical recognition of characters. One basic technique, called "mask matching", involves the matching or correlation between the character to be recognized and a set of standard character masks. In one form of this technique, the complete character is matched; in a second form, only selected points of the character are matched; and in a third form, the points that are matched are weighted according to their effectiveness in discriminating between characters. The mask matching technique, however, is critically dependent on the position of the characters as presented to the mask and also on the quality of the printing. In addition, this technique is not well adapted for use with multiple character fonts because it requires a separate masks for each character in every font.

A second general technique of character recognition, called "stroke analysis", involves the matching or correlation of combinations of strokes (e.g. vertical and horizontal straight lines) of the character to be recognized with the standard characters. This technique, however, is extremely complex, particularly for alphanumeric characters.

BRIEF SUMMARY OF THE INVENTION

A broad object of the present invention is to provide a new method and apparatus for the automatic recognition of characters having advantages in the above respects.

The present invention utilizes a single vertical line of photosensitive detectors to simultaneously scan, normalize and recognize the characters. During the reading operation, the line of detectors is oriented to extend continuously in the direction of the height of the optically projected characters, while relative movement is effected between the detectors and the characters in the direction of the width of the characters. Thus, each character is scanned along a plurality of distinct and continuous vertical scan lines. The character is recognized by using the information derived during those line scans of the character when a predetermined detector senses a change in sign (i.e. white-to-black or black-to-white) in its scanned portion of the character. This predetermined detector is preferably the one disposed to scan the characters along a line about midway of the average height of the lower-case characters excluding their ascenders and descenders.

Mauch et al U.S. Pat. No. 3,531,770 also utilizes a sampling technique triggered by a single detector. However, that arrangement utilizes a two-dimensional array of detectors, some of which are oriented vertically in the direction of the character height, whereas others are oriented horizontally in the direction of the character width. Such a two-dimensional array of detectors is substantially more costly to produce than the single line of detectors used in the present invention. Moreover, a system using the single line of detectors according to the present invention provides substantially more capability as to the different type fonts it can recognize using basically the same logic.

According to a further feature of the present invention, the single line of detectors is used to achieve both vertical alignment and size normalization. This is accomplished by having certain of the detectors in the linear array sense predetermined high and low limits of the characters. The electrical signals from these detectors are averaged over a selected interval, and are then used to control character alignment means and character magnifying means.

With respect to the latter feature, Rabinow U.S. Pat. No. 3,179,922 also describes a means of normalizing the size of the characters. In the present invention, among other differences, the vertical size normalization is based on the height of the lower-case letters, excluding their ascenders and descenders, which preserves their normal relationships to the lower case letters. It has been found that this manner of producing vertical size normalization is considerably more effective.

According to a still further feature of the invention, the sampled outputs of the linear array of detectors are stored in a shift register. Character recognition gates are connected to selected locations of the shift register in accordance with the character to be recognized. The apparatus further includes means for opening different character recognition gates at different time periods, enabling them to recognize their respective characters at different time periods. Means are provided, effective upon the recognition of a character, for inhibiting the recognition of any further characters until the start of a new character scan.

Further features and advantages of the invention will be described below.

BRIEF DESCRIPTION OF THE DRAWINGS

The invention is herein described, somewhat diagrammatically and by way of example only, with reference to the accompanying drawings which illustrate the invention as embodied in an optical character recognition system. In the drawings:

FIG. 2 is an enlarged view of the character "e" helpful in explaining its identification;

DESCRIPTION OF THE PREFERRED EMBODIMENT

General Construction

The preferred embodiment of the invention described herein is for use in an optical character recognition system. It was designed specifically as a reader for the blind, for reading conventional printed characters and converting them to braille embossments. It will be appreciated, however, that the system may be used in other applications, for example as a reading input device for a computer, type-setter or other data processor.

Briefly, the apparatus illustrated includes arrangements for scanning, character-sampling, character-recognition, alignment, registration, marginning, reading, line advance, and work-spacing. All these are described below in detail. The recognized characters are represented as pulses on output lines which may be fed to a braille embosser, computer, or other form of data processor.

Scanning

The scanning part of the apparatus comprises a raised glass window 2 for receiving face-down the book or other document carrying the printed characters to be read. Below, the glass window 2 is a carriage 4 movable by a first motor Mx in the x-direction, and by another motor My in the y-direction. The x-direction is that of the character width, and is the direction the detectors are moved during the reading of the characters; and the y-direction is that of the character height, and is the direction for advancing the detectors between character lines.

The carriage further carries a plurality of lamps 6 (two being shown) for illuminating the printed characters to be read. The characters are projected through a variable magnification optical system, generally designated 8, into a monolithic linear array of photo-transistor detectors D placed vertically in the image plane. The magnification of the optical system is controlled by another motor Mm.

In the system illustrated there are twenty-two detectors D1–D22, these being arranged in a vertical array in the direction of the height of the characters being read. Actually, only twenty detectors are used, detectors D1 and D22 being reserved for other uses.

Figure 1:
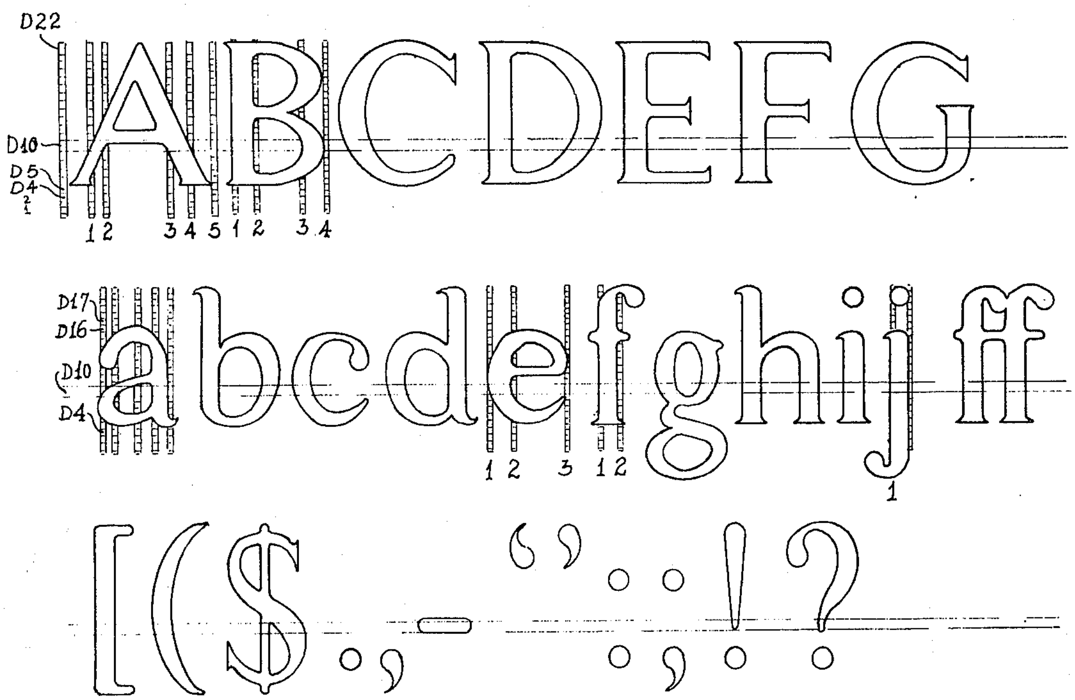
FIG. 1 examplifies several characters of a type font adapted to be read by the system illustrated.
Figure 1A:
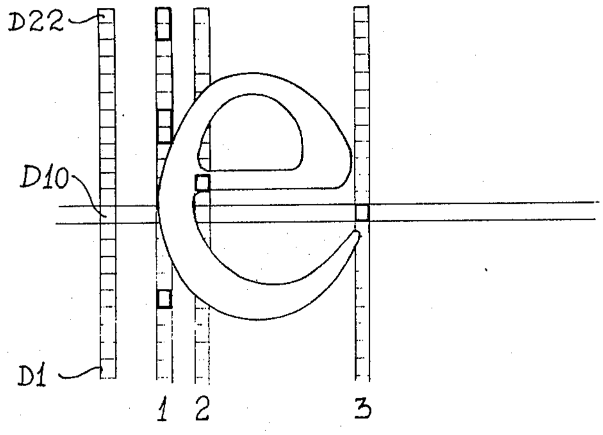

FIG. 1 illustrates several typical characters and the vertical disposition of the detectors with respect thereto during a reading operation. The arrangement is such that the upper-case letters are aligned between detectors D5–D22, and the lower-case letters are aligned between detectors D5–D16, with the descenders of the lower-case letters (e.g. in *g, j*) being partly intercepted by detectors D1–D4, and the ascenders (e.g. in *b, d*) being completely intercepted by detectors D17–D22. The juncture between detectors D4, D5 therefore defines the "base line" (i.e. the bottoms excluding the descenders) of the lower-case letters as well as the bottoms of the upper-case letters; whereas the juncture between detectors D16, D17 defines the "body line" of the lower-case letters (i.e. their tops, excluding their ascenders).

A predetermined detector, D10, in this linear array provides sampling pulses which are used in the character recognition process as will be described below. This predetermined detector D10 is about mid-way of the height of the lower-case letters, excluding their ascenders and descenders. Pulse *a*(FIGS *2a*, 3) illustrates the pulse produced by detector D10 on its output line 9 when it senses a change from white-to-black, and pulse *b* illustrates the corresponding pulse on output line 9 of detector D5.

The output lines 9 detectors D3–D22 (detectors D1, D2 not being used) are connected to amplifiers 10 which in turn are connected to comparators 10′ providing automatic level control for the output pulses (pulses *c* and *d*, respectively) whenever the detector senses at least a 50% black condition.

Character Sampling

The outputs of the amplifiers 10 and their comparators 10′ are fed via lines 11 to a plurality of 4-bit shift registers, generally designated 12.

Figure 3:
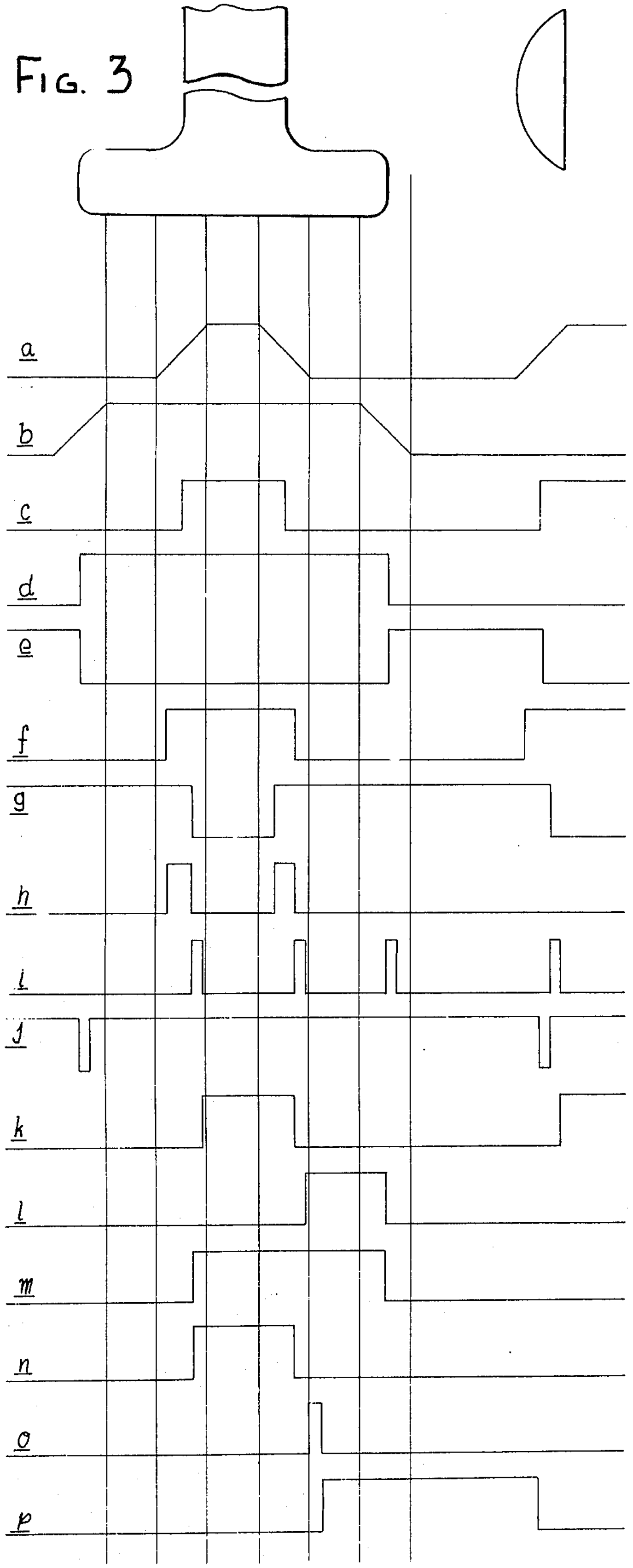
FIG. 3 illustrates a number of waveforms and the timing thereof as appearing in the system of FIG. 2.

The storing of the information from the detectors, however, is controlled by a sampling pulse produced from detector D10, which it will be recalled is about mid-way of the height of the lower-case letters. For this purpose, pulse *a* from the amplifier of detector D10 is fed via line 14 to a pair of comparators 16, 18. Comparator 16 produces an output pulse *f* (FIG. 3) whenever detector D10 senses 25 percent black, and comparator 18 produces an output pulse whenever detector D10 senses 75percent black, the output pulse from comparator 18 being inverted and appearing as pulse *g*. The two pulses *f* and *g* are fed to AND-gate 20, the output of which appears as two pulses *h*, the first one starting at the start of pulse *f* and terminating at the start of pulse *g*, and the second one starting at the end of pulse *g*, and terminating at the end of pulse *f*.

Pulses *h* are fed through an OR-gate 22 and line 23 to a monostable multivibrator 24 which produces on its output lines 25 a pulse *i* of a predetermined short duration for each of the pulses *h*, starting with the trailing edges thereof. Pulses *i* are the sampling pulses which are used in sampling and recognizing the characters.

A sampling pulse *i* is also produced each time detectors D3–D18 sense an all-white condition. This usually indicates the end of a character, but in a few cases it precedes the end of the character e.g. T and F. An all-white condition is sensed by feeding the outputs of amplifiers of detectors D3–D18 to AND-gate 26, the pulses being first inverted by invertors 28. A pulse *e* thus appears at the output of gate 26 whenever the detectors sense an all-white condition. Pulse *e* is fed, among other places, to OR-gate 22 via line 30 to produce a sampling pulse *i*.

Each sampling pulse *i* is fed via line 32 to the shift registers 12 to cause them to store the signals from the detectors whenever they appear in coincidence with a sampling pulse *i*. The sampling pulse *i* are also fed via line 34 to a counter 36 which produces a counting pulse for each of the sampling pulses *i*. These counting pulses (the first two being shown as pulses *k, l*) are fed via lines 37 to the character recognition gates 38, and serve to open different gates at different time periods, enabling the gates during the different time periods to receive the electrical data signals from the shift registers 12 and to recognize their respective characters thereby.

Character Recognition

In the system illustrated all the characters are recognized by examining certain points of the character during one to five sample pulses. The points of the character examined are determined by the character itself, i.e., when a predetermined detector (D10) senses a change in sign in its scanned portion of the character.

FIG. 1 illustrates many of the characters in the conventional type font and the samples of many characters which are examined in order to recognize them. some characters are recognized by merely taking one sample, others by taking two samples, and so on through five samples, which is the maximum needed for recognizing all the characters of the conventional type fonts. Thus, in the system described herein for purposes of illustration: character *j* (among others) is recognized on the first sampling pulse *i:* character *f* is recognized on the second sampling pulse *i:* character *e* is recognized on the third sampling pulse *i*, the latter being the sampling pulse produced by pulse *e* appearing when sensing an all-white condition by detectors D3–D18: character B is recognized on the fourth sampling pulse *i:* and character A is recognized on the fifth sampling pulse *i*, this pulse also being produced when the all-white condition is sensed by detectors D3–D18.

The following Table 1 sets forth, for purposes of example, one recognition logic design which includes the number of sampling pulses and the actual sampling points that may be used for identifying all the most common characters of the English type fonts.

TABLE 1

RECOGNITION LOGIC FOR CHARACTERS

| Char. | Pulse | Register Sampling Points | | | | | | | |
|---|---|---|---|---|---|---|---|---|---|
| a | 2 | −211 | −221 | 111 | −113 | −121 | | | |
| b | 4 | 413 | 420 | 315 | 208 | −221 | −105 | −114 | |
| c | 3 | −305 | −321 | −323 | −212 | 215 | −110 | | |
| d | 3 | −305 | −316 | −221 | 116 | 119 | | | |
| e | 3 | −305 | −321 | −323 | 212 | −110 | | | |
| f | 2 | 205 | 213 | −221 | −114 | 121 | | | |
| g | 3 | 304 | −317 | −107 | | | | | |
| h | 4 | 418 | 206 | −221 | 105 | | | | |
| i | 3 | 305 | 308 | 313 | −317 | −110 | −125 | | |
| j | 1 | 103 | 121 | | | | | | |
| k | 3 | 306 | 208 | −110 | | | | | |
| l | 3 | 318 | −214 | −221 | −110 | −125 | | | |
| m | 5 | 305 | 105 | | | | | | |
| n | 5 | 305 | −105 | | | | | | |
| o | 4 | −423 | −321 | −121 | | | | | |
| p | 3 | 303 | 107 | | | | | | |
| q | 3 | −304 | 103 | | | | | | |
| r | 3 | 305 | 313 | −317 | −110 | 124 | | | |
| s | 2 | 205 | −208 | 211 | −221 | −104 | −113 | −116 | |
| t | 3 | 307 | 317 | 205 | −208 | 216 | −110 | −121 | |
| u | 4 | −405 | 415 | −418 | −321 | 206 | | | |
| v | 5 | −313 | −221 | −110 | | | | | |
| w | 5 | −305 | −221 | −125 | | | | | |
| x | 3 | −307 | 215 | −110 | −125 | | | | |
| y | 2 | 103 | 107 | | | | | | |
| z | 3 | −314 | −110 | 124 | | | | | |
| A | 3 | 305 | −314 | −318 | 212 | −221 | 110 | | |
| B | 4 | 406 | 413 | 206 | 217 | 219 | −105 | | |
| C | 3 | −305 | 314 | −103 | −112 | 119 | | | |
| D | 3 | 305 | 314 | 320 | −214 | −105 | 118 | 119 | |
| E | 4 | 406 | 205 | −217 | 221 | −106 | | | |
| F | 3 | 314 | 320 | 214 | −110 | 121 | | | |
| G | 4 | −407 | 307 | 321 | −217 | | | | |
| H | 4 | 205 | 206 | 217 | 219 | 105 | | | |
| I | 3 | 318 | −213 | −214 | 221 | −110 | −125 | | |
| J | 2 | 206 | 211 | 219 | −105 | −114 | −119 | 121 | −123 |
| K | 4 | 406 | 314 | 108 | −118 | | | | |
| L | 3 | 306 | 317 | 109 | −112 | −118 | −121 | | |
| M | 5 | −414 | 419 | −221 | | | | | |
| N | 5 | 405 | 420 | 221 | | | | | |
| O | 4 | −406 | 413 | 216 | 219 | −121 | | | |
| P | 3 | 318 | 213 | −110 | −121 | − 125 | | | |
| Q | 3 | −304 | 103 | | | | | | |
| R | 4 | 305 | 118 | | | | | | |
| S | 3 | −311 | −213 | 106 | −117 | | | | |
| T | 3 | 314 | 320 | −214 | −110 | 121 | | | |
| U | 4 | −406 | 219 | 121 | | | | | |
| V | 5 | 408 | −420 | −110 | | | | | |
| W | 5 | 414 | −305 | | | | | | |
| X | 4 | −413 | 105 | | | | | | |
| Y | 3 | −320 | −221 | −110 | 121 | | | | |
| Z | 3 | 305 | 308 | −314 | 205 | −111 | | | |
| , | 1 | −110 | −111 | 124 | | | | | |
| 2 | 2 | −215 | 221 | 112 | −123 | | | | |
| 3 | 2 | 211 | 219 | −105 | −106 | −114 | −121 | −123 | |
| 4 | 2 | −204 | −205 | −207 | −213 | −223 | −123 | 124 | |
| 5 | 2 | −205 | 213 | −216 | −219 | 221 | −107 | −114 | −115 |
| 6 | 3 | 313 | 206 | 215 | 219 | 107 | | | |
| 7 | 3 | −314 | −205 | −110 | 121 | | | | |
| 8 | 4 | −413 | 321 | −105 | | | | | |
| 9 | 3 | −306 | 321 | −205 | −207 | −110 | −121 | | |
| 3 | 2 | −205 | 207 | −211 | −215 | −115 | −116 | | |
| 5 | 3 | −311 | −212 | −217 | 111 | −117 | | | |
| F | 2 | 213 | 217 | 114 | 122 | 123 | | | |
| ? | 3 | 305 | −308 | 321 | −110 | | | | |
| C | 3 | 208 | 219 | −110 | | | | | |
| V | 2 | 103 | −105 | | | | | | |
| G | 3 | −307 | 314 | 222 | −116 | | | | |
| R | 4 | 413 | 323 | −205 | 222 | −121 | | | |
| W | 5 | −420 | 221 | 110 | | | | | |
| E | 3 | 305 | 318 | 213 | 221 | −110 | −121 | 125 | |
| : | 3 | 305 | 318 | −213 | −223 | −110 | −121 | 125 | |
| . | 1 | −110 | −111 | −124 | | | | | |
| — | 2 | −204 | −205 | −207 | −213 | −223 | −123 | −124. | |

In Table 1, each character is identified by a pulse number and a plurality of sampling points.

The pulse number refers to the number of sampling pulses *i* needed to identify that character, which is also the number of the counting pulse (e.g. *k*, *l*) on which the character is recognized.

The sampling points refer to those positions in the shift registers 12 which are sampled to recognize the respective character. A minus sign before the sampling point indicates a "not" condition, which is obtained by applying an inverter to the respective output point of the shift registers 12. The shift register positions are numbered by adding the digit corresponding to the column number in front of the detector number. Thus, sampling point 422 identifies column 4, detector D22 of the shift registers; and sampling point 105 identifies column 1, detector D5. The information is read into the shift registers from the left side and is shifted one column to the right with each sampling pulse *i.* The shift register, however, is read out from its right side, and therefore the column number of the shift register is inverse to the sampling pulse number. Thus, sampling point 422 of the shift registers, in a character recognized by four sampling pulses, contains the information sensed by detector D22 during the first sampling pulse *i.*

Only four columns of shift registers 12 are needed. Where a character requires five sampling pulses for identification, the information stored with the first sampling pulse overflows and is lost on the fifth sampling pulse.

Figure 2A:
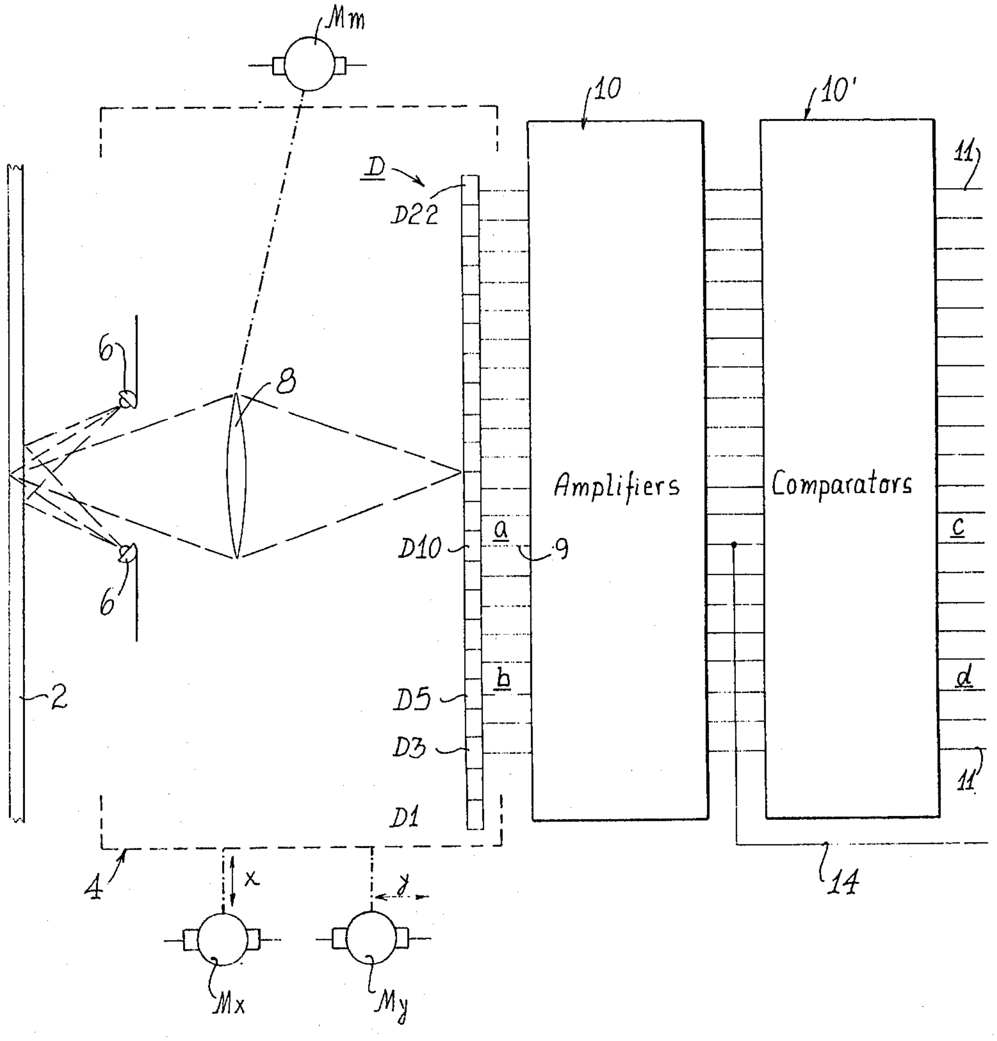
FIGS. 2*a*, 2*b* and 2*c*, taken together and sometimes referred to as FIG. 2, illustrate a logical flow diagram of the system.
Figure 2B:
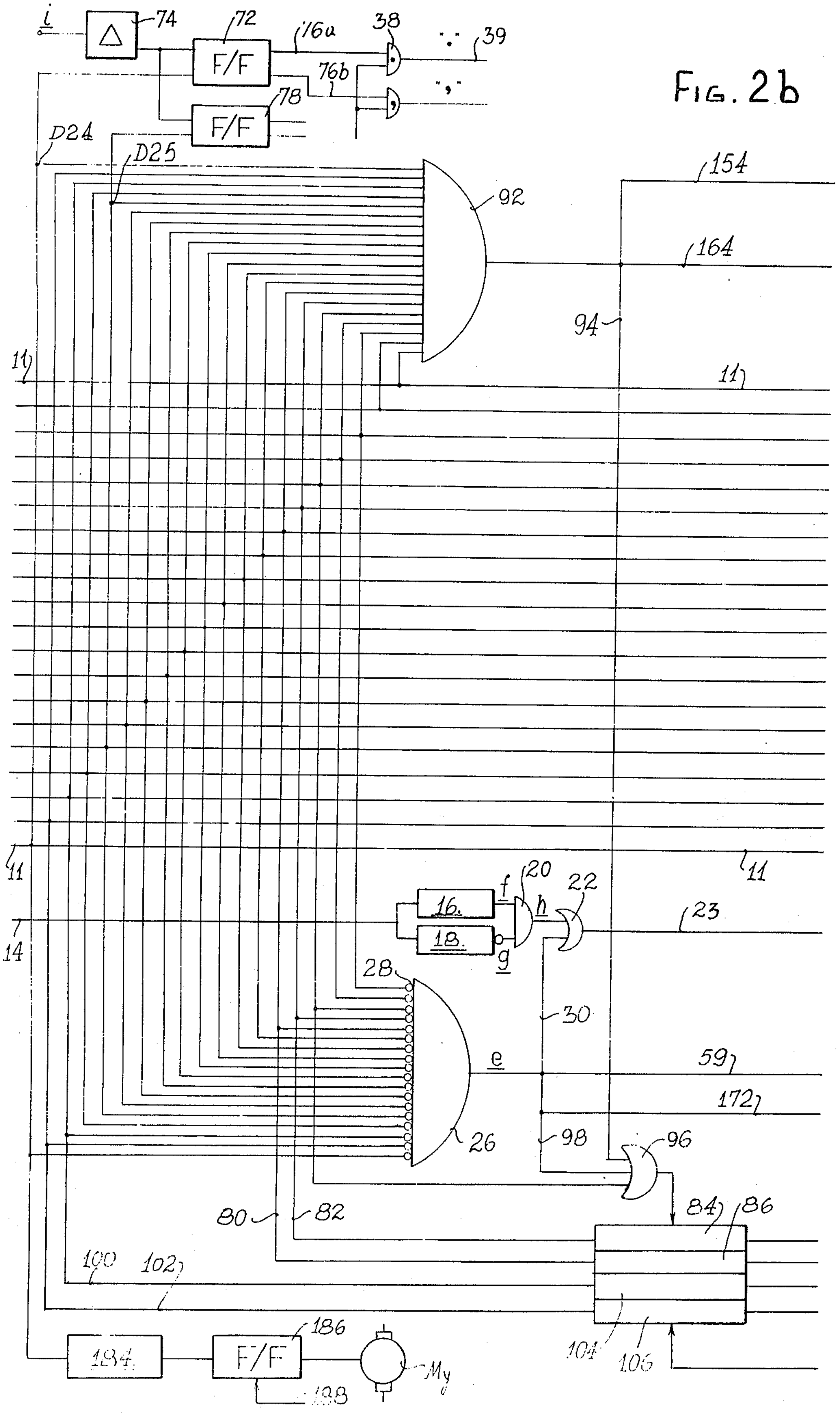
Figure 2C:
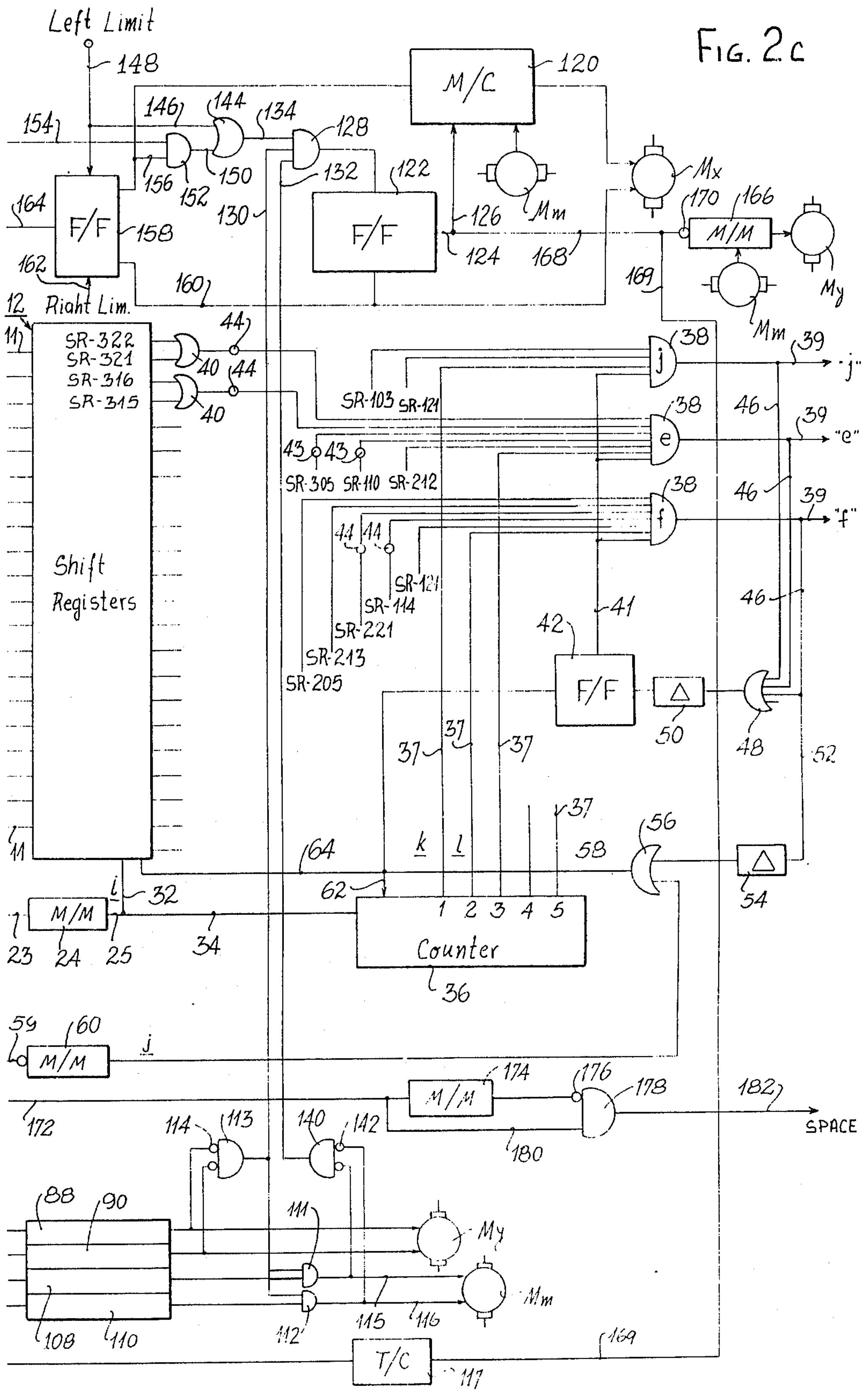

In Table 1, the digit 21 means 21 or 22, and the digit 23 means 16 or 15, both of the above being effective by using OR-gates, such as OR-gate 40, FIG. 2*c.* in the appropriate output lines of the shift registers 12. The meaning of the digits 24 and 25 in Table I will be explained below in connection with the description of the flip-flops 72, 78 connected to detectors D3 and D7, respectively.

The different positions in the shift registers 12 are connected to the various recognition gates 38 according to the recognition logic of Table 1. In addition, each of the recognition gates includes a connection to counter 36 to receive the specific counting pulse on which that character is recognized according to Table 1. The foregoing will be better understood by considering specific characters.

It will be seen from Table 1 that the lower-case letter *j* is recognized on the first sampling pulse, and requires only two sampling points, namely points 103 and 121 of the shift registers for recognizing the character. Thus, the recognition gate 38 for the lower-case character *j* includes an input from each of the shift register locations SR-103 and SR-121. In addition, it includes an input via line 37 to receive the first count (pulse *k*) from counter 36 produced by the sampling pulses *i.* Finally, it has an input via line 41 from Stop-Read flip-flop 42 enabling the gate to recognize the character only when the flip-flop is in its Reset condition.

From Table 1 it will also be seen that the lower-case character *f* is recognized on the second sampling pulse *i* and requires sampling points 205, 213, −221, −114 and 121. Thus its recognition gate 38 has inputs from shift register positions SR-205, SR-213, and SR-121. In addition, it has inputs from shift register positions SR-221 and SR-114, both of the latter, however, first passing through an inverter 44 to designate that these sampling points must be negative in order to recognize the character *f.* The input to its recognition gate 38 also includes the second counting pulse *l* supplied from counter 36 via line 37, and also the line 41, from the Stop-Read, flip-flop 42.

According to Table 1, the lower-case letter *e* is recognized with the third sampling pulse, and by sampling points −305, −321, −323, 212 and −110. Thus its recognition gate 38 includes an input form shift register position SR-212. In addition, it includes inputs from shift register positions SR-305 and SR-110, both of the latter first passing through an inverter 43. Further, it includes inputs from positions SR-315 or SR-316 fed through an OR-gate 40 and an inverter 44, to represent sampling point −323, and inputs from positions, SR-321 or SR-322, also fed through gate 40 and inverter 44, to represent sampling point −321 (per Table 1, where 23 means 15 or 16 and 21 means 21 or 22). Finally it includes a line 37 from the third counting pulse of counter 36, and a line 41 from the Stop-Read flip-flop 32.

Counter 36 is connected to all the character recognition gate 38 so that the appropriate count is applied to the gate corresponding to the pulse number during which that character is recognized.

Once a character is recognized, a pulse is applied to its output line 39, and also via one of lines 46 connected to the outputs of the respective recognition gates, to an OR-gate 48 connected through a delay circuit 50 to the Stop-Read flip-flop 42. Thus, whenever a character is recognized, and as soon as it is recognized, flip-flop 42 is set to disable all the character recognition gates 38, thereby inhibiting the further recognition of characters.

In operation, assume that with the first sampling pulse *i* (and therefore the first counting pulse *k*) detectors 3 and 21 sense black. The lower-case character *j* will then be recognized, and its recognition gate 38 will produce an output pulse on its line 39, and an inhibition pulse on its line 46. No further characters can thereafter be recognized until a new character is scanned.

In reading a second character, assume that during the first sampling pulse *i* detectors D5 and D13 sense black and detector D21 senses white: this will produce no recognition at that instant. Pulse *m*, FIG. 3, indicates the resulting pulses applied to the recognition gates. During the second sampling pulses, assume that detector D21 senses black and detector 14 senses white. Pulse *n* FIG. 3, indicates the resulting pulses applied to the recognition gates. With the second sampling pulse *i*, the second counting pulse *l* is transmitted to those character recognition gates 38 which are recognized on the second counting pulse, these gates including *f* as well as others, such as *a.*

It will thus be seen that with the second counting pulse, the character *f* is recognized, and therefore its recognition gate 38 will produce an output pulse (pulse *o*, FIG. 3) on line 39, as well as an inhibition pulse on its line 46, producing a Stop-Read pulse *p* fed to all the character gates.

In reading a third character, assume that with the first sampling *i*, detectors D5, D21 and D23 (the latter being detectors D15 or D16 as explained above) all sense white: no character is recognized. With the second sampling pulse, second sampling pulse, assume that detector D12 senses black; again no character is recognized. Assume that with the third sampling pulse detector D10 senses white. At this time, there is a coincidence of the third counting pulse with the shift register positions SR-305, SR-321, -SR-323, SR-212, and -SR-110, which will cause the lower-case letter *e* to be recognized. An output pulse is thus produced on its line 39 and an inhibition pulse on its line 46.

In this manner, all the characters may be recognized by using a maximum of five sampling pulses.

In the arrangement illustrated, there is only one exception to the inhibition of recognizing further characters once a character has been recognized, and that is when the lower-case character *f* has been recognized. When this occurs, a pulse is applied via line 52 to delay circuit 54 and through an OR-gate 56 to produce a resetting pulse on line 58 which resets flip-flop 42, conditioning the recognition gates 38 for recognizing further characters. In this manner, each letter of ligatures may be separated and recognized.

Flip-flop 42 is also reset when detectors D1–D18 sense an all-white condition. As indicated earlier, this normally means the termination of a character, bit in a few cases it precedes the end of a character, e.g. in the letters T and F, and is used in recognizing such characters. Pulse *e* produced by gate 26 is applied via line 59 to a monostable multivibrator 60, which produces a resetting pulse *j* applied to the OR-gate 56 and, via line 58, to the flip-flop 42, thereby conditioning all the recognition gates 38 for recognizing further characters. The resetting pulse is also applied via line 62 to reset counters 36, and via line 64 to reset the shift registers 12. Thus, when a complete character has been read, the resetting pulse produced by the sensed all-white condition resets counters 36 and shift registers 12, and reenables the recognition gates 38 for recognizing the subsequent character.

In some cases it may be desirable, in order to provide a further means of discrimination, to use in the character recognition a further electrical data signal indicative of whether a certain detector has sensed any black during at least a portion of the character scan period, i.e. between certain sampling pulses. This is where the digits 24 and 25 in Table I are involved.

FIG. **2*b* shows this feature as applied to the discrimination between the period and the comma. In this case, a connection is made from the amplifier for detector D3 to a flip-flop 72,** this connection being identified as D24, as if the scanning circuit included a twenty-fourth detector. The sampling pulse *i* is applied through a delay circuit 74 to reset flip-flop 72. If detector D3 has sensed any black during the scanning of the character from the time of the preceding sampling pulse, flip-flop 72, produces an output on line **76*b* to the character recognition gate 38** for the comma.

Table 1 uses this "simulated detector D24" for discriminating between certain characters, and also a "simulated detector D25" which is produced in the same manner from detector D7 applied to flip-flop 76.

Table 1 is but one example of the recognition logic that may be used for identifying a large number of different characters as appearing in different type fonts. The system illustrated, operating according to the recognition logic or Table 1, has been found to accurately read six different type fonts. Some fonts have characters which are so different from these of other fonts, that it is advisable to include separate recognition gates for these specific unusual characters. This is also shown at the end of Table 1, wherein it will be seen that duplicate recognition gates are provided for the numerical characters 3 and 5, and for the alphabetical characters F, C, etc.

Character Alignment and Size-Control

For purposes of aligning the characters, the line of characters are projected on the detectors D1–D22 so that a pair of adjacent detectors, in this case detectors D16 and D17, straddle the tops of the lower-case letters, excluding their ascenders.

This is accomplished by feeding the ouputs of the amplifiers for detectors D16 and D17, via lines 80, 82 to a pair of averaging circuits 84, 86. Detectors D16 and D17 are located so that they straddle the tops of the lower-case character, excluding their ascenders; if the projected characters are too low, detector D16 will sense too much white, and if they are too high, detector D17 will sense too much black. Detector D18 senses the ascenders and floats the averaging circuits when they occur. The ouputs of the respective averaging circuits 84, 86 are fed to comparators 88, 90 and are used to control motor My which moves the Carriage 4 in the y-direction, that is the character-height direction. Too much white sensed by detector 16 will cause motor My to lower the detector array, and too much black sensed by detector 17 will cause motor My to raise the detector array, until the tops of the lower-case characters (excluding their ascenders) are aligned exactly between the two detectors D16 and D17.

The averaging circuits are also floated or inhibited during the presence of the descenders of the lower-case characters. For this purpose the outputs of all the detectors D3–D22 are connected to an AND-gate 92 which provides the averaging circuits, via line 94 and OR-gate 96, with an all-black signal whenever all the detectors sense a black condition.

The averaging of the outputs of detectors D16 and D17 is also inhibited when an all-white signals appears (normally indicating a space between characters or words) from AND-gate 26, this signals being fed to the averaging circuits 84, 86 via line 98 and OR-gate 96.

Thus, the carriage is continuously being aligned, except when the averaging circuits are floated as described above.

Once the detectors have been aligned with respect to the projected characters, their base line (i.e. their bottoms, excluding the descenders of the lower-case characters) is sensed, and is used to control motor Mm which controls the magnification of the optical system 8. In this manner, the size of the optically-projected characters is varied until the base line of the characters is disposed between a pair of lower, adjacent detectors, in this case, detectors D4, D5.

To accomplish this, the amplified outputs of detectors D4 and D5 are fed through lines 100, 102 to another pair of averaging circuits, 104, 106 their outputs being fed to comparators 108, 110 which control magnification motor Mm. Thus, if detector D5 senses too much white, motor Mm is set to operate to increase the magnification, and if detector D4 senses too much black, the motor is set to operate to decrease the magnification.

In the arrangement illustrated, magnification motor Mm is not operated until the characters have been first aligned, this being assured by AND-gate 111, 112, each having one input from the respective comparator and another input from an AND-gate 113 connected to the outputs of the two alignment comparators 88, 90, the latter outputs being first inverted by inverters 114. Thus lines 115 and 116 will effect increase or decrease in the magnification of the projected characters only when the characters are properly aligned with the detectors and an output signal appears from the respective comparator 108 or 110.

The averaging circuits 104, 106 which control the magnification of the projected characters are also floated during an all-black signal on line 94, or an all-white signal on line 98.

All the averaging circuits 84, 86, 104 and 106 average the outputs of their respective detectors over a few (e.g. two or three) words of the line. This is controlled by a timing circuit 117 which switches the time constants to longer valves during READ.

Marginning, Reading, Line-Advance and Word-Spacing

Motor Mx which controls the carriage in the character-width or x-direction normally operates at high speed, but its circuit includes a slow-speed control unit 120 (FIG. 2*c*) which is actuated to reduce the speed of the motor for the slower READ speed. Slow-speed unit 120 is controlled by a flip-flop 122 which, when it is in its set condition, produces a READ output on line 124, fed by line 126 to the slow-speed control unit 120, thereby to reduce the speed of motor Mx. When flip-flop 122 is in its reset (NOT-READ) condition, no such output signal is produced on line 124, and therefore motor Mx operates a high speed.

Flip-flop 122 is actuated in its set (i.e. READ) condition by means of an AND-gate 128 having three input lines, namely line 130 to assure proper alignment of the characters, line 132 to assure proper magnification of the characters, and line 134 to assure proper left-marginning.

Line 130 is connected to AND-gate 113 which, as described earlier, assures proper alignment of the characters.

Input line 132 is connected to AND-gate 140 having two inputs from comparators 108, 110, which are in the above-described circuit for controlling the magnification to the projected characters. Both inputs are inverted by inverters 142, so that only when the projected characters are of the correct size to be exactly registered with respect to the detectors will an output signal be fed from AND-gate 140 to line 132.

Input line 134 is connected to the output of OR-gate 144, the latter having two inputs, namely: line 146 which is connected to the left limit-switch 148, which is closed when the carriage positions the detectors at the extreme left side of the machine; and line 150, which is the output of AND-gate 152, the latter having two inputs, namely line 154 from the all-black AND-gate 92, and line 156 from a J-K flip-flop 158.

J-K flip-flop 158 has two stable output states, namely; output line 156 which drives scanning motor Mx in the RIGHT or reading direction; and output line 160 which drives motor Mx in the LEFT or reverse (retrace) direction. This flip-flop has, in addition to the input of the left limit-switch 148, also an input from a right limit-switch 162, which sets the flip-flop to produce an output on line 160, to drive motor Mx in the left or retrace direction.

Flip-flop 158 is triggered by an all-black pulse from AND-gate 92 via line 164. The all-black pulse is also fed to AND-gate 152 via line 154.

Thus, AND-gate 128 will set flip-flop 122 into READ (assuming that the alignment and registration are proper) when either one of two conditions has occurred, namely; when left limit switch 148 has been actuated, which occurs when the carriage is at its extreme left position or when AND-gate 92 produces an all-black signal (on line 154) and flip-flop 158 is set in the condition where the motor is driving the carriage to the right. When flip-flop 122 is set to its READ condition, motor control circuit 120 is actuate to switch motor Mx to low speed.

The detectors are thus driven in low speed to read the character line until motor Mx is reversed, which occurs when either the right limit switch is actuated, or an all-black signal is produce from AND-gate 92. The motor Mx is then driven in a fast reverse speed for RETRACE.

At the same time, a signal is applied to monostable multivibrator 166 via line 168 and inverter 170, which which actuates LEAD motor My for advancing the detectors one character line to read the next line of characters. Also, a signal is fed from line 168 via line 169 to reset the timing circuit 117.

The motor control unit 120 for controlling the READ speed of motor Mx, and monostable multivibrator 166 for controlling LEAD motor My, are both controlled by the magnifying means. This is schematically indicated by the magnification motor Mm input to both of these units. The arrangement is such that the speed of scanning of motor Mx during the READ operation, and the magnitude of the line advanced by motor My during the LEAD operation, are controlled by the amount of magnification of the projected characters.

The work-spaceing is controlled by the all-white signal (pulse *o*) from AND-gate 26. This pulse is applied via line 172 to a monostable multivibrator 174, the output of which is inverted at 176 before being applied to an AND-gate 178. The second input of AND-gate 178 is by line 180 connected directly to line 172. The foregoing arrangement is to provide a predetermined delay after an all-white signal from AND-gate 26, before a word-space signal si produced from AND-gate 178 on line 182.

When the last line of the page has been read, detector D3 sense black for a significant time period (about 1 second), this being averaged by circuit 184 (FIG. 2*b*) and fed to a flip-flop 186 to actuate motor My to bring the carriage detectors to the top of the page. Flip-flop 186 is reset by a signal fed from line 188 when the carriage detectors have been moved to the top.

SUMMARY OF OPERATION AND AVANTAGES

To operate the machine, the book or other document to be read is placed on top of window 2, and the carriage 4 automatically moves so that the detectors are in alignment with the projected characters starting with the top line of the page. When the alignment, size and left margin conditions for a READ operation have been fulfilled as determined by AND-gate 128, flip-flop 122 is set to cause the machine to go into a READ operation wherein the carriage 4 is driven by motor Mx in the x-direction at slow reading speed.

During the READ operation, whenever detector D10 senses a change in sign, that is a change from white-to-black or black-to-white, a sampling pulse (pulse *i*) is generated on line 25. A sampling pulse *i* is also generated whenever the detectors sense an all-white condition on detectors D3–D18. Each sampling pulse is directed to shift registers 12, enabling them to store the outputs of all the detectors during the sampling pulse. In addition, the sampling pulses *i* are directed to counter 36 which counts them occurring during the scan of the character and directs counting pulses $k$, $l$ to different character recognition gates 38. This enables each gate to recognize its respective character during the specific time period that its counting pulse appears. The character recognition gates 38 are connected to the various locations in shift registers 12 according to the recognition logic of Table 1, so that as these recognition gates receive the counting pulse from counter 36, they also receive coincident therewith the information stored in the shift registers 12. When there is coincidence between the required sampling points for a specific character, and the counting pulse necessary to recognize that character, the character will be recognized, and a recognition signal will be produced on the respective output line 39.

As soon as the character is recognized, a STOP-READ signal is also produced on line 46 of the recognized character gate to inhibit the recognition of any further characters, except in the case where the character $f$ is recognized, in which case a disabling signal is produced on line 52 to diable the STOP-READ signal. This permits the recognition of ligatures.

When a complete line has been scanned an output signal is produced from AND-gate 92 to flip-flop 122 which terminates the READ operation and starts the RETRACE operation wherein motor Mx drives the carriage in a fast reverse speed; also, motor My is actuated to advance the carriage and the detectors one line with respect to the projected characters.

It has been found that the technique of the present invention eminently solves the problem of alignment and registration of the characters with respect to the detectors.

This technique has been found to be well adapted for use with multiple font characters, and in fact the system described herein has been found very satisfactory with six different type fonts. This is because the sampling points are determined not by arbitrarily predetermined points, or by weighted points, but rather by the shape of the character itself, primarily when a predetermined detector (D10 in this case) senses a change from white-to-black or black-to-white. Other means of discrimination are also used, namely when a combination of detectors (D3–D18 in this case) senses a change, or when a predetermined detector has sensed any black in at least a portion of a character scan (simulated detectors D24, D25). The technique can be adapted for a much larger number of fonts, by merely making the required additions or changes in the recognition logic. Also, separate recognition gates may be included where the special form of a character in a particular type font deviates so much from the more conventional type font that it would be preferably to include such a special character recognition gate rather than to modify the recognition logic of the other gates.

Further, it has been found that the simplicity and reliability of the system are increased by dividing the character identification into different time periods (by the counting pulses $k$, $l$) and, once a character has been recognized, inhibiting the recognition of further characters.

Further, the system of the present invention substantially reduces the storage capacity and other components required, by about one order of magnitude when compared to other multiple character font recognition systems, and therefore enables a substantial lowering in the cost of manufacturing same.

Figure 4A:
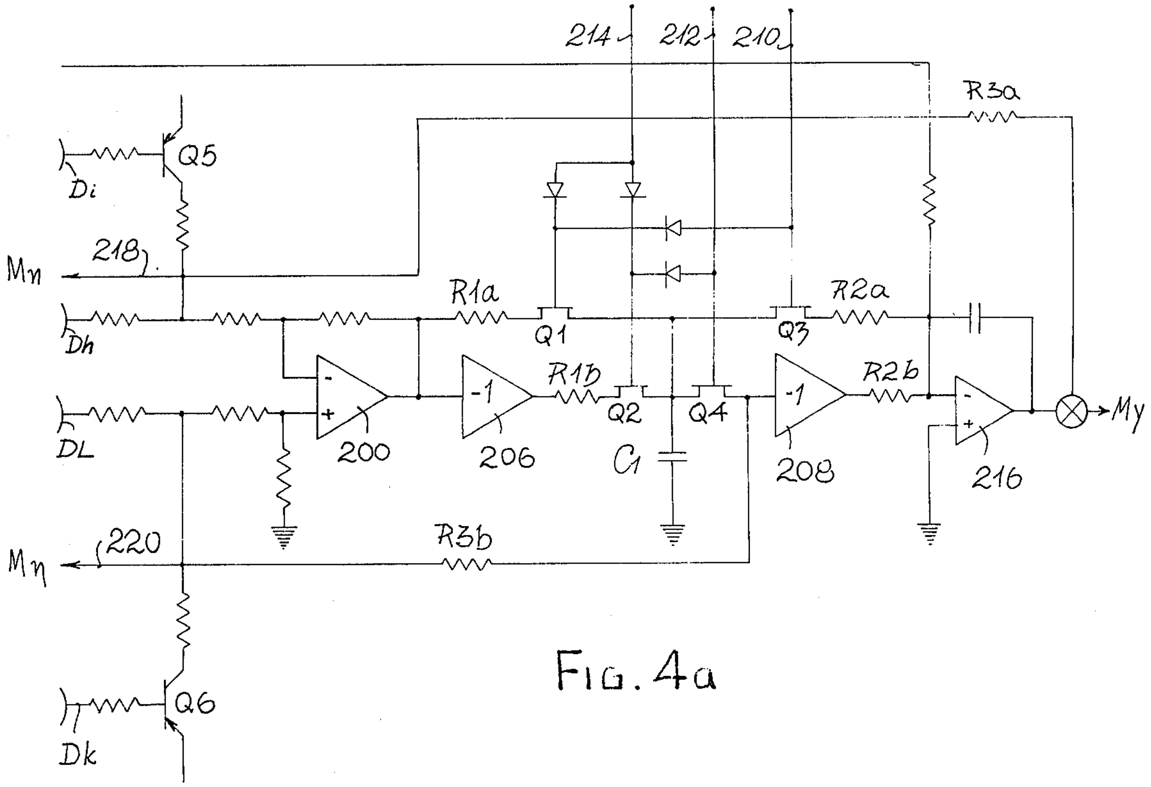
FIGS. 4*a* and 4*b* illustrate another arrangement that may be used to effect vertical alignment (FIG. 4*a*) and size-normalization (FIG. 4*b*) of the characters with respect to the detectors.
Figure 4B:
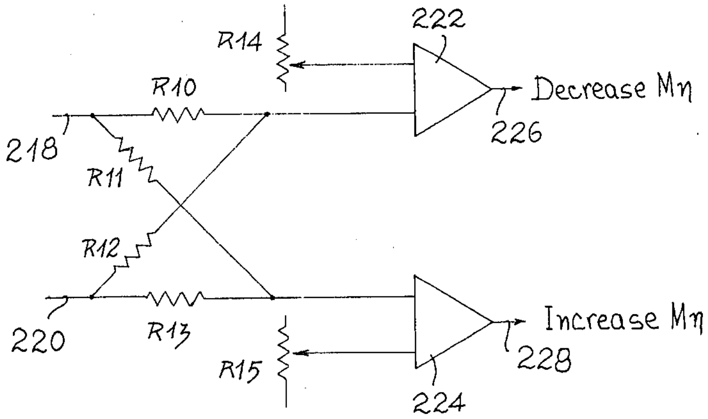

Variation of FIGS. 4*a* and 4*b*

FIGS. 4*a* and 4*b* illustrate a variation that may be used for effecting vertical alignment and size normalization of the projected characters with respect to the line of detectors.

In this case, the high and low sensing means each includes a single detector Dh and DL instead of a pair of detectors. Their analog outputs are connected to a differential amplifier 200 which feeds a signal corresponding to the difference in their outputs, to a capacitor Cl through one of two paths; namely, through a direct path including line 202, or through an inverted path including line 204 and inverter 206. The first path (line 202) is for right-left travel of the carriage, and the second path (line 204) is for left-right travel of the carriage. This arrangement is particularly advantageous in the presence of tilt, since the effective voltage on the capacitor must change sign every time the carriage changes direction. The output from capacitor Cl is likewise inverted by inverter 208 for left-right motion.

Switching from one path to the other is accomplished by using four field-effect-transistors (FET). Two FETs (Q1, Q2) control the inputs to capacitor C1, and two other FETs (Q3, Q4) control its output. When the carriage is moving from right-to-left, a signal is applied on line 210 to FETs Q1 and Q3 enabling the RL path 202, the latter including resistors R1a, R2a; and when the carriage is moving from left-to-right, a signal is applied on line 212 to FETs Q2 and Q4 enabling the LR pathe 204, the latter including resistors R1b, R2b.

The two input FETs Q1 and Q2 are also cut-off by the "all white" (AW) and the "all black" (AB) signals supplied via line 214, which has the effect of jamming all the characters next to one another resulting in smoother and more accurate tracking.

The high and low detectors Dh and DL ride just above the body line and just below the base line, respectively, of the lower-case characters. They thus scan the average tops and bottoms of the lower-case characters excluding their ascenders and descenders. Capacitor C1 averages their outputs over an interval corresponding to several words, which is sufficiently accurate for text containing a relatively small numer of ascenders and descenders. However, when many ascenders and descenders are present, there would be a tendency for the carriage to ride high or low. This difficulty is avoided by inhibiting the high and low detectors Dh, DL by their respective higher and lower neighboring detectors Di, Dk, the inhibition being effected by two transistors Q5 and Q6.

Capacitor C1 thus produces a signal which corresponds to the difference in the average outputs of the high and low detectors Dh, DL. This signal is applied to integrator 216 which provides an output to the y-servomotor My of one sign to cause the latter to lower the detectors when they are riding too high, or of the opposite sign to raise the detectors when they are riding too low.

The circuit, insofar as described, would exhibit a tendency to instability since it consists of an integrator plus lag in a feedback loop. To overcome this tendency, the circuit of FIG. 4*a* includes resistors R3a and R3b, the former being connected between the input to motor My and the output of the high-inhibit transistor Q5, and the latter being connected between the input to the inverter 208 and the output of the low-inhibit transistor Q6.

The magnification motor Mm is also floated upon the occurrence of ascenders and descenders in the lower case characters, as in the previously described system. This is accomplished in the circuit of FIG. 4*a* by providing a connection 218,220, from the outputs of the high inhibit and low-inhibit transistors Q5, Q6 to the magnification servomotor Mm.

The outputs of the high and low detectors, Dh, DL, are used to control the magnification servomotor Mm to effect size-normalization. This circuit is also floated upon the occurence of ascenders and descenders in the lower-case characters, and therefore the detector outputs are taken from lines 218 and 220, respectively, i.e. after their connection to the inhibit transistors Q5 and Q6.

FIG. 4*b* illustrates the control of the magnifying servomotor Mm, wherein it will be seen that lines 218 and 220 are connected to a summing circuit, including resistors R10, R11, R12, R13, which sums the voltages and feeds them to two comparators 222, 224. If the sum is too large, in comparison to a predetermined value as preset by potentiometer R14 connected to comparator 222 a signal is produced on its output line 226 to magnification servomotor Mm, instructing it to decrease the magnification; on the other hand if the sum is too small, in comparison to a predetermined value as preset by potentiometer R15 connected to, comparator 224, its output line 228 supplies a signal to servomotor Mm instructing it to increase the magnification. When the sum falls between the two limits preset by resistors R14, R15, the magnification is correct, and servomotor Mm is deactivated.

Many other variations, modifications, and applications of the illustrated embodiments will be apparent.

What is claimed is:

1. Apparatus for the automatic recognition of alphanumeric characters, comprising a single line of detectors extending continuously in the direction of the height of the characters to be recognized; certain of said detectors being high and low limit sensing detectors; means optically-projecting a line of characters on the line of detectors; means effecting relative movement between said line of detectors and said characters in the direction of the width of the characters, whereby said line of detectors scans each character along a plurality of parallel single lines extending continuously in the direction of the height of the character; means for sampling all the detectors each time a predetermined detector senses a change in sign in its scanned portion of the character to produce sample electrical data signals; a recognition circuit receiving said electrical data signals for recognizing the characters therefrom; and normalizing means including said high and low limit sensing detectors for sensing the average top and bottom boundaries of the projected characters and controlling in accordance therewith the alignment and size of said optically-projected characters with respect to said line of detectors, said normalizing means including alignment means effecting relative displacement between the line of detectors and the optically projected characters to align one of said boundaries with respect to its limit sensing detector, and size-control means controlling the size of said optically-projected characters to align the other of said boundaries with respect to its limit sensing detector.

2. Apparatus as defined in claim 1, wherein said predetermined detector is disposed to scan the characters along a line about midway of the average height of the lower-case characters excluding their ascenders and descenders.

3. Apparatus as defined in claim 1, wherein two adjacent detectors are high-limit sensing detectors and two other adjacent detectors are low-limit sensing detectors; wherein said alignment means includes a first averaging circuit connected to the output of one high-limit sensing detector located to scan the characters just above said tops, means responsive to the output of said averaging circuit controlling said alignment means to effect a displacement of said detectors in one direction with respect to the optically-projected characters, a second averaging circuit connected to the output of the other high-limit sensing detector located to scan the characters just below said tops, and means responsive to the output of said second averaging circuit controlling said alignment means to effect a displacement of the detectors in the opposite direction with respect to the optically-projected characters; and wherein said size-control means includes magnifying means, a third averaging circuit connected to the output of one low-limit sensing detector located to scan the character just above said bottoms means responsive to the output of said third averaging circuit to control the magnifying means to increase the magnification of said optically-projected characters, a fourth averaging circuit connected to the output of the other low-limit sensing detector located to scan the character just above said bottoms, and means responsive to the output of said fourth averaging circuit to decrease the magnification of said optically projected characters.

4. Apparatus as defined in claim 1, wherein one detector is a high-limit sensing detector and another detector is a low limit sensing detector; and wherein said alignment and size-control means includes detector displacing means, character-magnifying means, a first averaging circuit connected to the output of said high-limit sensing detecor a second averaging circuit connected to the output of said low-limit sensing detector, first summing means producing a first signal corresponding to the difference in the outputs of said first and second averaging circuits, means responsive to said first signal controlling said character-displacing means, second summing means producing a second signal corresponding to the sum of the outputs of the first and second averaging circuits, and means responsive to said second signal controlling said magnifying means.

5. Apparatus as defined in claim 1, further including means for disabling said predetermined high and low limit sensing detectors when other detectors sense an ascender or descender in the character being scanned.

6. Apparatus as defined in claim 1, further including means for disabling said high and low limit sensing detectors when said line of detectors sense an all-white condition indicating the end of a character.

7. Apparatus as defined in claim 1, further including means responsive to the sensing of an all-black condition by said line of detectors indicating the end of a line for reversing the direction of scanning and for advancing the detectors one line with respect to the characters being read.

8. Apparatus as defined in claim 1, further including means controlled by said size-control means for controlling the speed of scanning of the characters by said detectors.

9. Apparatus for the automatic recognition of alphanumeric characters, comprising a single line of detectors extending continuously in the direction of the height of the characters to be recognized; means effecting relative movement between said line of detectors and said characters in the direction of the width of the characters, whereby said line of detectors scans each character along a plurality of parallel single lines extending continuously in the direction of the height of the character; means for sampling all the detectors each time a predetermined detector senses a change in sign in its scanned portion of the character to produce sample electrical data signals; and a recognition circuit receiving said electrical data signals for recognizing the characters therefrom, wherein said recognition circuit includes a shift register storing said electrical data signals in a plurality of locations; a plurality of character-recognition gates one for each character to be recognized, each of said gates being connected to selected locations of said shift register in accordance with the character to be recognized thereby; and means for opening different ones of said gates at different time periods enabling them during said different time periods to receive said electrical data signals from their respective locations of the shift register and to recognize the respective character thereby.

10. Apparatus as defined in claim 9, wherein said last-named means comprises a counter producing a counting pulse for each sampling of the detectors, and means feeding said counting pulses to different ones of said recognition gates to open them at different time periods.

11. Apparatus as defined in claim 9, wherein said recognition means includes means effective upon the recognition of a character for generating a stop-read pulse and for feeding same to all said recognition gates to disable same from recognizing any further characters during the remainder of the character scan.

12. Apparatus as defined in claim 11, further including means generating a character terminating pulse when all the detectors sense the absence of a character, said character terminating pulse re-enabling the recognition gates to recognize a subsequent character.

13. Apparatus as defined in claim 12, further including means connected to the output of the recognition gate for at least one of said characters for generating a character terminating pulse re-enabling all said recognition gates to recognize a subsequent character.

14. Apparatus as defined in claim 9, wherein certain of said detectors are high and low limit sensing detectors; and wherein the apparatus further includes: means optically-projecting a line of characters on the line of detectors; and normalizing means including said high and low limit sensing detectors for sensing the average top and bottom boundaries of the projected characters and controlling in accordance therewith the alignment and size of said optically-projected characters with respect to said line of detectors, said normalizing means including alignment means effecting relative displacement between the line of detectors and the optically-projected characters to align one of said boundaries with respect to its limit-sensing detector, and size-control means controlling the size of said optically-projected characters to align the other of said boundaries with respect to its limit sensing detector.

15. Apparatus as defined in claim 14, wherein two adjacent detectors are high-limit sensing detectors and two other adjacent detectors are low-limit sensing detectors; wherein said alignment means includes a first averaging circuit connected to the output of one high-limit sensing detector located to scan the characters just above said tops, means responsive to the output of said averaging circuit controlling said alignment means to effect a displacement of said detectors in one direction with respect to the optically-projected characters, a second averaging circuit connected to the output of the other high-limit sensing detector located to scan the characters just below said tops, and means responsive to the output of said second averaging circuit controlling said alignment means to effect a displacement of the detectors in the opposite direction with respect to the optically-projected characters; and wherein said size-control means includes magnifying means, a third averaging circuit connected to the output of one low-limit sensing detector located to scan the character just above said bottoms, means responsive to the output of said third averaging circuit to control the magnifying means to increase the magnification of said optically-projected characters, a fourth averaging circuit connected to the output of the other low-limit sensing detector detector located to scan the character just above said bottoms, and means responsive to the output of said fourth averaging circuit to decrease the magnification of said optically projected characters.

16. Apparatus as defined in claim 14, wherein one detector is a high-limit sensing detector and another detector is a low-limit sensing detector; and wherein said alignment and size-control means includes detector-displacing means, character-magnifying means, a first averaging circuit connected to the output of said high-limit sensing detector a second averaging circuit connected to the output of said low-limit sensing detector, first summing means producing a first signal corresponding to the difference in the outputs of said first and second averaging circuits, means responsive to said first signal controlling said character-displacing means, second summing means producing a second signal corresponding to the sum of the outputs of the first and second averaging circuits, and means responsive to said second signal controlling said magnifying means.

17. A method for the automatic recognition of alphanumeric characters comprising the steps of: optically-projecting a line of the characters on a linear array of detectors extending in the direction of the height of the characters, at least one of said detectors sensing a high permissible limit of the projected characters and at least one other detector sensing a low permissible limit of the projected characters; effecting relative movement between the detectors and the characters in the direction of the width of the characters, to cause the detectors to scan the characters along a plurality of continuous and distinct scan lines; effecting relative displacement between the linear array of detectors and the optically-projected characters to align one of said limits of the projected characters with respect to its respective limit sensing detector; varying the magnification of the optically-projected characters to align the other of said limits of the projected characters with respect to its limit sensing detector; sampling all the detectors in said linear array each time a predetermined detector thereof senses a change from black-to-white or white-to-black; and utilizing the sampled outputs of the detectors for recognizing the character.

18. The method as defined in claim 17, wherein the optically-projected characters are aligned and magnified so that the average tops and bottoms of the lowercase characters, excluding their ascenders and descenders, coincide with said high and low limit detectors.

19. The method as defined in claim 17, including the further step, after the recognition of the character, of inhibiting the recognition of further characters until the start of scanning of a new character.

* * * * *